Aug. 26, 1930.  J. E. HAYNES  1,774,369
INTERNAL COMBUSTION ENGINE
Filed Aug. 1, 1928   2 Sheets-Sheet 1
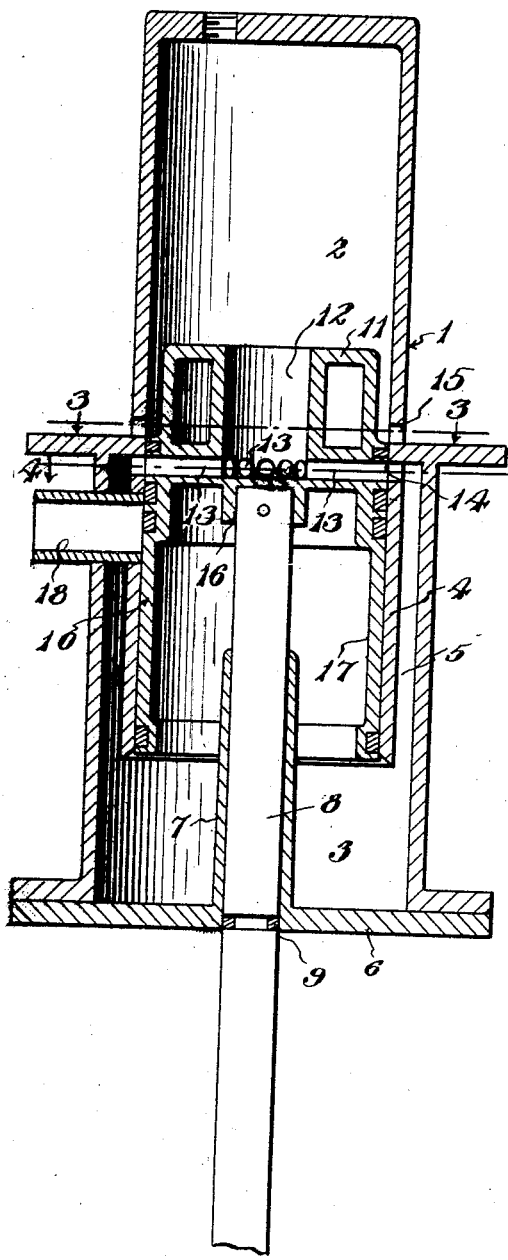
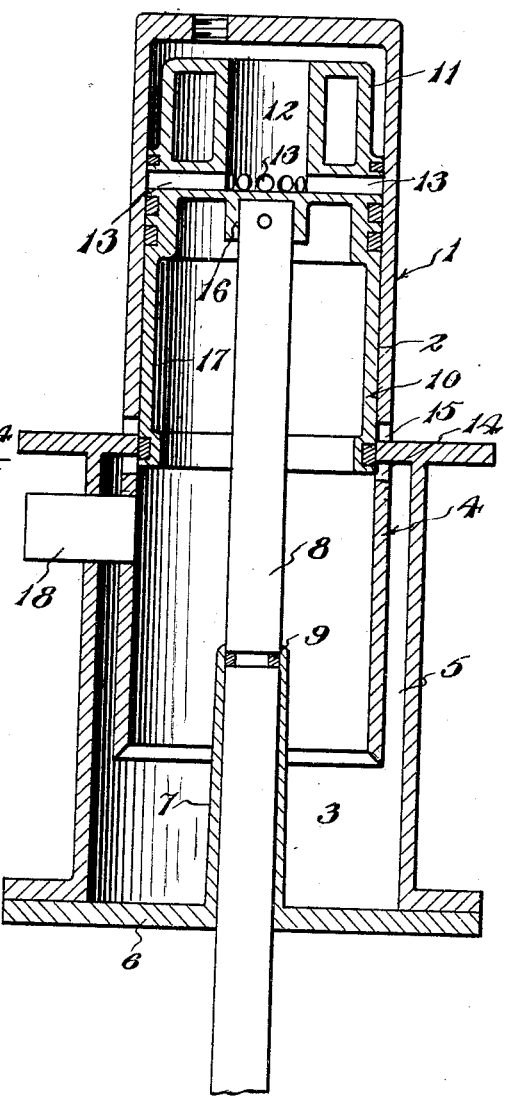
INVENTOR.
J. E. Haynes
BY
Lacey & Lacey, ATTORNEYS Aug. 26, 1930.  J. E. HAYNES  1,774,369
INTERNAL COMBUSTION ENGINE
Filed Aug. 1, 1928  2 Sheets-Sheet 2

INVENTOR.
J. E. Haynes
BY
Lacey & Lacey, ATTORNEYS

Patented Aug. 26, 1930

1,774,369

UNITED STATES PATENT OFFICE

JOSEPH ERVIN HAYNES, OF LAWRENCE, MASSACHUSETTS

INTERNAL-COMBUSTION ENGINE

Application filed August 1, 1928. Serial No. 296,728.

The present invention is directed to improvements in internal combustion engines.

The primary object of the invention is to provide an engine of the two-cycle type which is exceedingly simple in construction and efficient in operation.

Another object of the invention is to provide an engine of this kind wherein the construction is such that the incoming combustible charge will momentarily act upon the burnt gas in a manner to drive the same from the combustion chamber to maintain said chamber in a thoroughly scavenged state.

Another object of the invention is to provide an engine of this type which will develop considerable power with small fuel consumption.

With these and other objects in view, this invention resides in the novel features of construction, formation, combination and arrangement of parts to be hereinafter more fully described, claimed and illustrated in the accompanying drawings, in which:—

Figure 1 is a vertical sectional view through the device showing the piston in one of its positions.

Figure 2 is a similar view showing the piston in another position.

Figure 3:
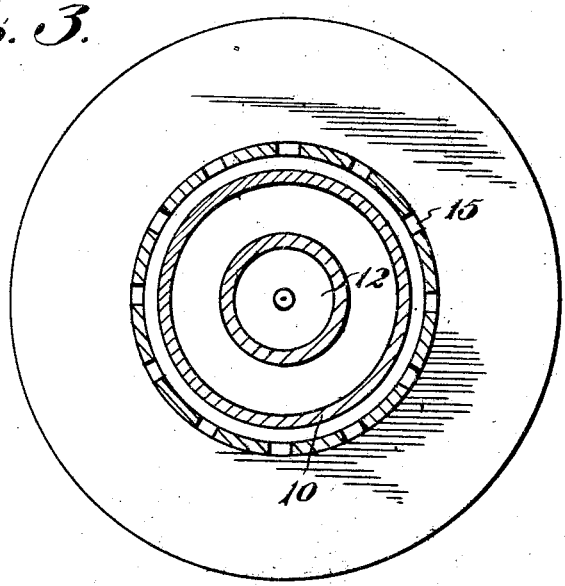
Figure 3 is a sectional view on line 3—3 of Figure 1.
Figure 4:
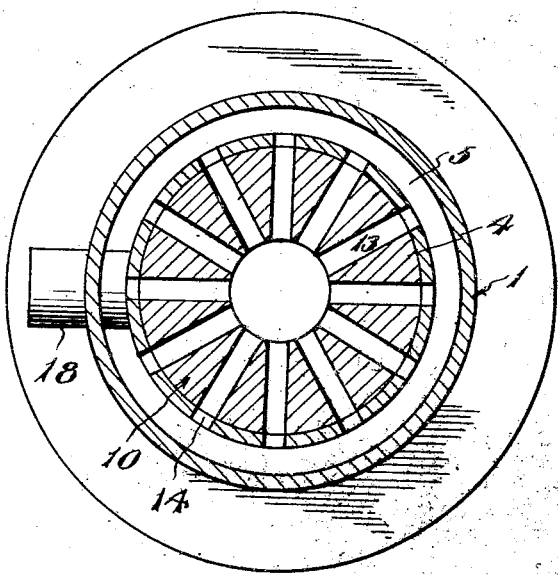
Figure 4 is a sectional view on line 4—4 of Figure 1.

Referring to the drawings, 1 designates a cylinder which includes an upper combustion chamber 2 and a lower fuel pumping chamber 3, the latter being of greater diameter than the former and in which depends the concentrically arranged shell 4 spaced from the wall of the chamber 3 to provide an annular space 5.

The shell 4 has its lower edge spaced from the lower plate 6 which closes the lower end of the chamber 3, said plate having rising centrally therefrom a tubular guide 7 in which slides the piston rod 8, suitable packing 9 being carried thereby to prevent leakage of fluid from the chamber 3.

The piston 10 includes a reduced cored dome 11 in which is formed a vertical passage 12, said passage having its lower end communicating with the radially disposed ducts 13 which have their outer ends arranged for registration with the inlet ports 14 formed in the shell 4 and at the upper end thereof. Exhaust ports 15 are formed in the lower end of the wall of the chamber 1 a short distance above the ports 14, the ports 14 being in direct communication with the annular space 5. The upper end of the rod 8 is fixed in a socket 16 formed centrally of the piston and axially confined by the skirt 17 of said piston.

Extending through the wall of the chamber 3 and having its inner end fitted in the shell 4 for communication with the interior thereof is a fuel inlet tube 18 which is alternately opened and closed by the skirt 17 during reciprocation of the piston. It will be of course understood that the tube 18 will be connected in a suitable manner to a carburetor.

When the piston 10 is in position as shown in Figure 1 the exhaust ports 15 are opened to atmosphere, and continued upward movement of the piston will of course close the ports 14 and 15. In Figure 1 the ducts 13 and ports 14 are also shown in registration thus permitting the charge from the chamber 3 to pass from the space 5 through the ducts 13 and ports 14, through the passage 12 and into the chamber 2, the pressure of the incoming charge being sufficient to scavenge the chamber 2 before the ports 15 are closed by the piston as it moves upwardly on its compression stroke. The ports 14 and 15 are so arranged that after the exhaust ports are open the inlet ports begin to open, thus permitting the incoming charge to scavenge the chamber 2 before the exhaust ports are closed. The upward movement of the piston will obviously draw gas from the inlet tube 18 intermittently, and further it will be observed that there will be a reserve supply of combustible fuel in chamber 3.

The reciprocation of the piston 10 is rapid and consequently the exhaust ports will be closed by the piston immediately after the charge from the chamber 3 enters the passage 12 for compression between the piston and top wall of the chamber 3.

From the foregoing, it is thought that the construction, operation and many advantages of the herein described invention will be apparent to those skilled in the art, without further description, and it will be understood that various changes in the size, shape and proportion and minor details of construction, may be resorted to without departing from the spirit or sacrificing any of the advantages of the invention.

What is claimed is:—

An internal combustion engine comprising a cylinder including an upper combustion chamber and a lower pumping chamber, the combustion chamber having an annular flange forming a continuation of the lower end thereof and spaced from the wall of said pumping chamber, a plate closing the bottom of said pumping chamber and having an axial upright guide tube projecting into said annular flange, there being a circular series of exhaust ports formed in said cylinder and there being a circular series of intake ports formed in said flange and underlying said exhaust ports, said combustion chamber, said flange and said pumping chamber being formed in one piece adapted to be attached to a crank case and be sealed therefrom by said plate, a piston in said cylinder movable longitudinally through said combustion chamber and through said annular flange, a piston rod connected to said piston and slidably fitted in said tubular guide, a packing member carried by said rod and engaging the wall of said guide for preventing leakage of gas into the crank case, said piston having a dome provided with an axial vertical opening, said dome having an annular cooling space surrounding said axial opening, there being a circular series of horizontally disposed ducts opening through the side wall of said dome and communicating with said opening, said ducts being adapted to alternately register with said exhaust and intake ports, and a fuel supply pipe extending through the wall of the pumping chamber and through the wall of said annular flange, said fuel supply pipe being alternately opened and closed by reciprocation of said piston.

In testimony whereof I affix my signature.

JOSEPH ERVIN HAYNES. [L. S.]